US008919397B2

(12) United States Patent
Mariani et al.

(10) Patent No.: US 8,919,397 B2
(45) Date of Patent: Dec. 30, 2014

(54) MOTORCYCLE TYRE

(75) Inventors: Mario Mariani, Milan (IT); Pierangelo Misani, Milan (IT); Andrea Schiavolin, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1045 days.

(21) Appl. No.: 12/997,925

(22) PCT Filed: Jun. 20, 2008

(86) PCT No.: PCT/IT2008/000420
§ 371 (c)(1),
(2), (4) Date: Dec. 14, 2010

(87) PCT Pub. No.: WO2009/153821
PCT Pub. Date: Dec. 23, 2009

(65) Prior Publication Data
US 2011/0162769 A1   Jul. 7, 2011

(51) Int. Cl.
*B60C 11/113* (2006.01)
*B60C 11/03* (2006.01)
*B60C 3/04* (2006.01)

(52) U.S. Cl.
CPC ......... *B60C 11/0302* (2013.04); *B60C 11/0311* (2013.04); *B60C 2011/0374* (2013.04); *B60C 11/033* (2013.04); *B60C 3/04* (2013.01); *B60C 2200/10* (2013.04)
USPC .................................................. 152/209.11

(58) Field of Classification Search
CPC ............ B60C 11/0311; B60C 11/0316; B60C 2200/10; B60C 2200/12
USPC ............ 152/209.11; D12/534–537, 569–572, D12/506
See application file for complete search history.

(56) References Cited

U.S. PATENT DOCUMENTS 4,112,994 A * 9/1978 Mills et al. ............... 152/209.11
4,364,426 A  12/1982 Mills et al.
(Continued)

FOREIGN PATENT DOCUMENTS

GB    1 487 958    10/1977
JP    61-92903     5/1986
(Continued)

OTHER PUBLICATIONS

English machine translation of JP06-028860B, dated Apr. 1994.*

(Continued)

*Primary Examiner* — Justin Fischer
*Assistant Examiner* — Robert Dye
(74) *Attorney, Agent, or Firm* — Finnegan, Henderson, Farabow, Garrett & Dunner, L.L.P.

(57) ABSTRACT

A motorcycle tire includes: a tread band with a tread pattern including, in a zone symmetrically arranged on either side of the equatorial plane, a first module repeatedly duplicated in a direction of circumferential extension of the tire. The module has at least two first longitudinal grooves inclined in an oppositely arranged manner relative to the equatorial plane; and at least two substantially transverse grooves designed to intersect the two longitudinal grooves so as to define at least one block. The zone has a width in the axial direction of between 20% and 65% of the width of the tread band and a solids/voids ratio equal to at least 0.20. The tread pattern also has at least one substantially transverse continuous portion which extends over the entire width of the tread band delimiting at least one end of the module in the circumferential direction.

30 Claims, 3 Drawing Sheets

(56) References Cited

U.S. PATENT DOCUMENTS

| | | | | |
|---|---|---|---|---|
| 4,606,389 | A | * | 8/1986 | Haas ................. 152/209.11 |
| D287,955 | S | * | 1/1987 | Hayakawa et al. ......... D12/536 |
| D288,915 | S | * | 3/1987 | Kadomaru ................. D12/536 |
| 6,276,415 | B1 | * | 8/2001 | Nakamura ............... 152/209.11 |
| 2006/0219342 | A1 | | 10/2006 | Steinbach |

FOREIGN PATENT DOCUMENTS

| | | | | |
|---|---|---|---|---|
| JP | 06-028860 | B | * | 4/1994 |
| JP | 07-108604 | B | * | 11/1995 |
| JP | 9-300917 | | | 11/1997 |
| JP | 10-324116 | | | 12/1998 |
| JP | 2001-071711 | | * | 3/2001 |
| WO | WO 2005/005169 | A1 | | 1/2005 |
| WO | WO 2009/153822 | A1 | | 12/2009 |

OTHER PUBLICATIONS

English machine translation of JP07-108604B, dated Nov. 1995.*
English machine translation of JP2001-071711, dated Mar. 2001.*
International Search Report from the European Patent Office for International Application No. PCT/IT2008/000420, mailed Jan. 30, 2009.
International Preliminary Report on Patentability for International Application No. PCT/IT2008/000420 dated Dec. 21, 2010.

* cited by examiner

MOTORCYCLE TYRE

CROSS REFERENCE TO RELATED APPLICATION

This application is a national phase application based on PCT/IT2008/000420, filed Jun. 20, 2008, the content of which is incorporated herein by reference.

BACKGROUND OF THE INVENTION

1. Field of the Invention

The present invention relates to motorcycle tyres. In particular, the present invention relates to tyres intended to be mounted on the front wheel and/or on the rear wheel of "enduro street" motorcycles with a medium to large engine capacity (for example 700-1000 $cm^3$ or more) and/or high power (for example about 100 hp or more).

2. Description of Related Art

Recently there has been a tendency to introduce onto the market "enduro street" motorcycles which are intended for mixed use both on roads and off-the-road and which have an increasingly higher greater capacity and/or power. In fact, there are already present on the market, for example, enduro motorcycles with an engine capacity of 1250 $cm^3$ and power of about 100 hp.

The tyres mounted on the wheels of these motorcycles must ensure a stable behaviour both on ordinary roads and along mountain roads which have a large number of bends and even in cross-country terrain, together with the capacity to travel a large number of kilometers.

Therefore, they must have excellent road-holding and traction properties so as to be able to transmit effectively to the ground the high driving torque on widely varying terrain and also ensure an effective braking action. Grip and traction also assume critical importance in wet road and off-the-road travel conditions.

These tyres must, moreover, ensure stability and comfort during roadway travel as well as a fairly high level of performance and grip, in particular when accelerating out of bends.

Obtaining all of the above-mentioned characteristics appears to be particularly difficult, partly because of the conflicting nature of these characteristics, in particular in the case of motorcycle tyres which must be able to cope with such varied travel conditions.

U.S. Pat. No. 4,364,426 describes a motorcycle tyre having a tread provided with a plurality of spaced blocks defined by a plurality of first circumferentially spaced grooves which extend substantially diagonally across the tread. The first grooves channel the water from the centre of the tread and extend continuously one side to the other of the tread. Each first groove has moreover a middle portion which extends substantially circumferentially. The middle portions of two adjacent first grooves are spaced by a block defined by first adjacent grooves.

JP61092903 describes a tyre for "enduro on-off" motorcycles designed to ensure uniformity of contact by providing on the tread band a plurality of blocks arranged in the circumferential direction of the tyre. The top edge of at least one side of the blocks is designed so as to be positioned along both the side edges of the tread band, projecting outwards from the contour of the central portion of the tread.

SUMMARY OF THE INVENTION

The Applicant has noted that in practice it is, for example, not possible to ensure optimum traction of the tyre on cross-country terrain without adversely affecting to a certain extent the tyre performance in terms of number of kilometers traveled and noisiness/vibrations.

At the same time the Applicant has noted that it is not possible to ensure an optimum performance of the tyre along roads without adversely affecting in some way the tyre performance in terms of traction, controllability and steerability on slippery, sandy and/or muddy terrain.

The Applicant has also noted that there is a tendency for the camber angles which the tyre assumes during off-the-road use to be smaller, while the same angles of the tyre are greater during roadway use.

The Applicant is therefore of the opinion that, in the case of a tyre intended for motorcycles designed for both roadway and off-the-road use, the central zone of the tread may be mainly designed to provide traction and water drainage on all types of terrain, in particular in off-the-road conditions, while the outermost zones of the tread band may be mainly designed to provide lateral stability, grip and controllability, in particular when accelerating out of bends and braking during roadway travel.

The Applicant, in order to satisfy the partly conflicting requirements mentioned above, has developed a tread pattern comprising blocks which extend in the circumferential direction mainly in the central zone of the tread band, where it has been determined that their presence is particularly advantageous, in order to obtain the desired performance characteristics of the tyre in terms of traction and acceleration on rough or bumpy surfaces and water drainage on wet surfaces.

At the same time, the presence of a substantially continuous transverse portion which extends over the entire tread band also helps ensure adequate grip and stability during roadway travel.

Therefore, according to a first aspect, the invention relates to a motorcycle tyre comprising a tread band having a tread pattern comprising, in a zone (L) symmetrically arranged on either side of the equatorial plane (X-X), a first module repeatedly duplicated in a direction of circumferential extension of the tyre comprising:

at least two longitudinal grooves inclined in an oppositely arranged manner relative to the equatorial plane (X-X);

at least two substantially transverse grooves intersecting the said two longitudinal grooves, so as to define at least one block;

said zone (L) having a width of between 20% and 65% of the width of the tread band and a solids/voids ratio equal to at least a 0.20;

said tread pattern also having at least one substantially transverse continuous portion which extends over the entire width of the tread band delimiting at least one end of the said module in the circumferential direction.

In the remainder of the present description and in the claims below the term "block" is understood as indicating a tread band portion delimited by consecutive sections of grooves or by edges of the tread in both the axial and circumferential direction, the block having two maximum dimensions, i.e. a transverse dimension and a longitudinal dimension, which are mutually perpendicular, one of which being at least less than 50% of the width C of the cord of the tyre.

The present definition also includes the case where the recess or the groove section delimiting the block has an interruption, i.e. a section with a substantial reduction in depth, normally known as "bridge" with an extension smaller than or equal to 30% of the extension of the section or the recess in question.

For the purposes of the present invention "solids/voids ratio" is understood as meaning the ratio between the overall surface area of the recesses of a given portion of the tyre tread band (or in some cases of the entire tread band) and the overall surface area of the given tread band portion (or in some cases of the entire tread band).

In the remainder of the present description and in the following claims the terms "axial" and "axially" are used to indicate a direction substantially perpendicular to the equatorial plane of the tyre, namely a direction substantially parallel to the axis of rotation of the tyre. The terms "circumferential" and "circumferentially" are used to indicate a direction substantially parallel to the equatorial plane of the tyre along the annular extension of the tyre.

In the remainder of the present description and in the following claims, moreover, the expression "tyre foot-print area" is understood as meaning the portion of the peripheral surface of the tread band in contact with the road surface.

Moreover, in the remainder of the present description and in the following claims, the measurements of angles and/or linear quantities (distances, widths, lengths, etc.) and/or surfaces are understood as referring to the layout of the tread pattern.

Moreover, with reference to the angulation of the grooves and/or the recesses formed in the tread band relative to the equatorial plane of the tyre, this angulation is to be understood as referring, for each point of the groove and/or recess, to the angle (ranging between 0° and 180°) formed by a rotation performed from the equatorial plane into the direction tangential to the groove and/or recess passing through this point.

In one or more preferred aspects, the present invention may comprise one or more of the characteristic features indicated below.

Preferably, the geometric module may comprise a further transverse groove defining a further block with the longitudinal grooves.

In this way the gripping effect of the tread band in the central zone, in the vicinity of the equatorial plane, is increased.

According to a further embodiment, the first transverse grooves may extend axially over at least 50% of the width of the tread.

According to a further embodiment, the transverse grooves may be arranged along broken lines. In this way the gripping faces of the tread band are increased.

Advantageously, the transverse grooves may be arranged along the broken line so as to form a vertex between the two first longitudinal grooves.

The presence of the vertices helps create a gripping and guiding effect of the central zone of the tyre during off-the-road use on particularly soft ground.

In order to heighten the above-mentioned effect, preferably all the transverse grooves may be arranged along broken lines so as to form a vertex between the two first longitudinal grooves.

In order to reduce the phenomenon of irregular wear which typically affects the corners in the central zone of the tread band, the vertices may all be spaced relative to the equatorial plane X-X.

Advantageously, the vertices are all directed in the same circumferential direction.

According to a further embodiment, the vertices of a same geometric module are situated axially opposite, relative to the equatorial plane (X-X), to the vertices of the circumferentially consecutive geometric module.

According to a further embodiment, the transverse grooves have a depth greater than or equal to 3 mm.

Advantageously, the transverse grooves have a depth less than or equal to 10 mm.

According to a further embodiment, the transverse grooves have a width greater than or equal to 4 mm.

Advantageously, the transverse grooves have a width less than or equal to 18 mm.

According to a further embodiment, the transverse grooves have a width variable along their extension so as to increase towards the axially outer edges of the tread band.

According to another embodiment the two first longitudinal grooves may have a longitudinal extension equal to at least 5% of the circumferential extension of the tread band and an inclination less than or equal to 15° relative to the equatorial plane X-X.

Such a distribution and extension of the first longitudinal grooves increases the drainage effect of the tyre since the water is removed in the central portion of the tread, channeled and continuously conveyed into the vicinity of the axially outer edges of the tread band where it is expelled.

Advantageously, the two longitudinal grooves may have a different inclination relative to the equatorial plane X-X.

According to a further embodiment, one of the two first longitudinal grooves has a longitudinal extension greater than the remaining longitudinal groove.

Advantageously, the first longitudinal grooves may have a depth greater than or equal to 3 mm and less than or equal to 10 mm.

According to a further embodiment, the first longitudinal grooves may have a width greater than or equal to 1.5 mm.

Advantageously, the first longitudinal grooves may have a width less than or equal to 10 mm.

According to a further embodiment, at least one of the first longitudinal grooves may have a width variable along its extension. The variation in width of the longitudinal groove, if suitably oriented in the sense of rotation of the tyre, all other factors being equal, increases the drainage efficiency thereof.

In order to increase the drainage capacity, in particular around bends, the module may comprise at least one second substantially longitudinal groove situated in a middle zone on the outside relative to the first longitudinal grooves between the equatorial plane X-X and axially outer edge of the tread band.

Advantageously, the second substantially longitudinal groove may have an inclination of less than 11° with the equatorial plane X-X.

According to a further embodiment, each module is symmetrical with the module which is circumferentially consecutive relative to the equatorial plane X-X.

According to a further embodiment, a further substantially transverse groove may be provided between two circumferentially consecutive geometric modules.

Advantageously, this substantially transverse groove is arranged along a broken line so as to form three sections with an increasing inclination relative to the equatorial plane X-X from the equatorial plane X-X to the axially outer edge of the tread band.

Such a groove increases the gripping faces of the tread band providing the tyre with traction, while the particular inclination thereof favours water drainage.

Further characteristic features and advantages of the present invention will emerge more clearly from the detailed description of a preferred, but not exclusive embodiment of a motorcycle tyre with a tread band according to the present invention.

BRIEF DESCRIPTION OF THE DRAWINGS

This description is provided hereinbelow with reference to the accompanying drawings provided solely by way of a non-limiting example in which.

DETAILED DESCRIPTION OF THE INVENTION

Figure 1:
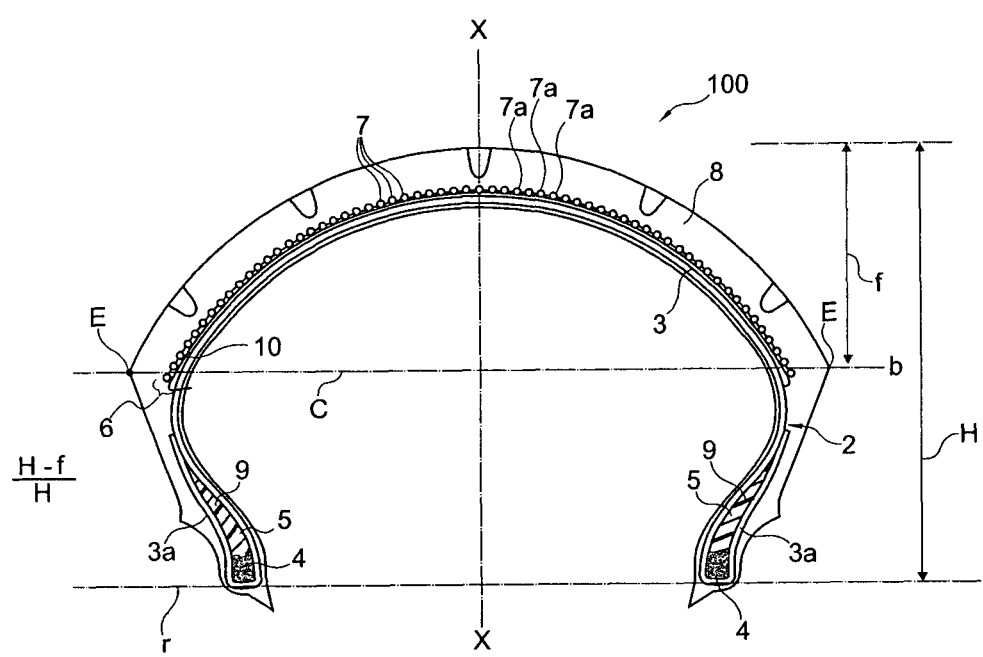
FIG. 1 is a radial section along a plane radial with respect to the axis of rotation of a motorcycle tyre according to the present invention.

With reference to the said figures, 100 denotes in its entirety a motorcycle tyre according to the present invention.

The motorcycle tyre 100 comprises a carcass structure 2 formed by at least one carcass ply 3. The carcass ply 3 is made of elastomer material and comprises a plurality of reinforcing elements arranged parallel to each other and typically oriented perpendicularly with respect to the circumferential direction.

The carcass ply 3 is engaged, by means of its opposite circumferential edges, with at least one annular reinforcing structure 9.

In particular, the opposite side edges 3a of the carcass ply 3 are folded back around annular reinforcing structures called "bead wires".

A tapered elastomer filling element 5 is mounted on the axially outer perimetral edge of the bead wires 4 and occupies the space defined between the carcass ply 3 and the corresponding folded-back side edge 3a of the carcass ply 3.

As is known, the tyre zone comprising the bead wire 4 and the filling element 5 forms the so-called bead intended to fix the tyre on a corresponding mounting rim (not shown).

The reinforcing elements included in the carcass ply 3 comprise preferably textile cords chosen from among those usually used for the manufacture of tyre carcasses, for example made of nylon, rayon, PET, PEN, with a base yarn having a diameter of between 0.35 mm and 1.5 mm.

In an alternative embodiment (not shown) the opposite side edges of the carcass ply are associated, not folded back, with particular annular reinforcing structures 9 provided with two annular inserts. A filling element made of elastomer material may be arranged in an axially outer position with respect to the first annular insert. The second annular insert is, instead, arranged in an axially outer position with respect to the end of the carcass ply. Finally, a further filling element which completes the design of the annular reinforcing structure may be provided in an axially outer position with respect to said second annular insert and not necessarily in contact therewith.

A belt structure 6 is circumferentially mounted on the carcass structure 2 in a radially outer position and has, circumferentially arranged on top of it, a tread band 8 in which, following a moulding operation performed at the same time as vulcanisation of the tyre, longitudinal and/or transverse recesses are typically formed and arranged so as to define a desired tread pattern.

The tyre 100 may also comprise a pair of sidewalls which are mounted laterally on opposite sides of said carcass structure 2.

The tyre 100 has a cross-section distinguished by a high transverse curvature and by lowered sidewalls as defined below.

In particular, the tyre 100 has a cross-sectional height H measured, along the equatorial plane, between the top of the tread band and the fitting diameter defined by the reference line r passing through the beads of the tyre.

The tyre 100 also has a width C defined by the distance between the laterally opposite ends E of the tread and a curvature defined by the particular value of the ratio between the distance f of the top of the tread from the line passing through the ends E of the tread, measured along the equatorial plane of the tyre, and the above-mentioned width C. The ends E the tread may be formed as a corner.

In the present description and in the following claims "high-curvature tyres" is understood as meaning tyres which have a ratio of curvature $f/C \geq 0.2$ and preferably $f/C \geq 0.28$. This ratio of curvature f/C is, in any case, $\leq 0.8$ and preferably $f/C \leq 0.7$, for example 0.32.

As regards the sidewalls, the invention is applicable preferably to tyres with particularly low sidewalls (FIG. 1). In other words, "tyres with low or lowered sidewalls" in the present description is understood as meaning tyres where the height/sidewall ratio (H-f)/H is less than 0.7 and more preferably less than 0.6, for example 0.56.

The carcass structure 2 is typically lined on its inner walls with a sealing layer or so-called "liner", essentially consisting of a layer of airtight elastomer material able to ensure a hermetic seal of the tyre itself once inflated.

Preferably, the belt structure 6 consists of a layer 7 which has a plurality of circumferential windings 7a arranged axially alongside each other and formed by a rubber cord or by a band comprising a number of rubber cords (preferably from two to five) wound spirally with an angle substantially equal to zero (typically between 0° and 5°) relative to the equatorial plane X-X of the tyre. Preferably the belt substantially extends over the entire crown portion of the tyre.

Alternatively, the belt structure 6 may consist of at least two radially superimposed layers, each consisting of elastomer material reinforced with cords arranged parallel to each other. The layers are arranged so that the cords in the first belt layer are oriented obliquely relative to the equatorial plane of the tyre, while the cords in the second layer are also oriented obliquely, but symmetrically intersect the cords of the first layer (so-called "cross belt").

In both cases, generally, the cords of the belt structure are textile or metal cords. Preferably, said cords are made using high carbon content (HT) steel wires, namely steel wires with a carbon content greater than 0.9%. Where textile cords are used, these may be made of synthetic fibre, for example nylon, rayon, PEN, PET preferably high-modulus synthetic fibre, in particular aramid fibres (for example Kevlar® fibres). Alternatively, hybrid cords comprising at least one yarn with a low modulus, i.e. not greater than about 15'000 N/mm² (for example nylon or rayon), interwoven with at least one yarn with a high modulus (such as Kevlar®), i.e. not less than 25'000 N/mm², may be used.

Optionally, the tyre 100 may also comprise a layer of elastomer material 10 situated between said carcass structure 2 and said belt structure 6 formed by said circumferential turns, said layer 10 extending preferably over an area substantially corresponding to the area covered by said belt structure 6. Alternatively, said layer 10 extends over an area less than the area covered by the belt structure 6, for example only over opposite side portions of the latter.

In a further embodiment, an additional layer of elastomer material (not shown in FIG. 1) is situated between said belt structure 6 and said tread band 8, said layer extending preferably over an area substantially corresponding to the area covered by said belt structure 6. Alternatively, said layer extends only over at least one portion covered by the belt structure 6, for example over opposite side portions thereof.

In a preferred embodiment at least one of said layer 10 and said additional layer comprises short aramid, for example Kevlar®, fibres dispersed in said elastomer material.

According to an important characteristic feature of the invention the tread band 8 has, formed therein, a tread pattern comprising a module 14 repeatedly duplicated in a direction of circumferential extension of the tyre.

Figure 2:
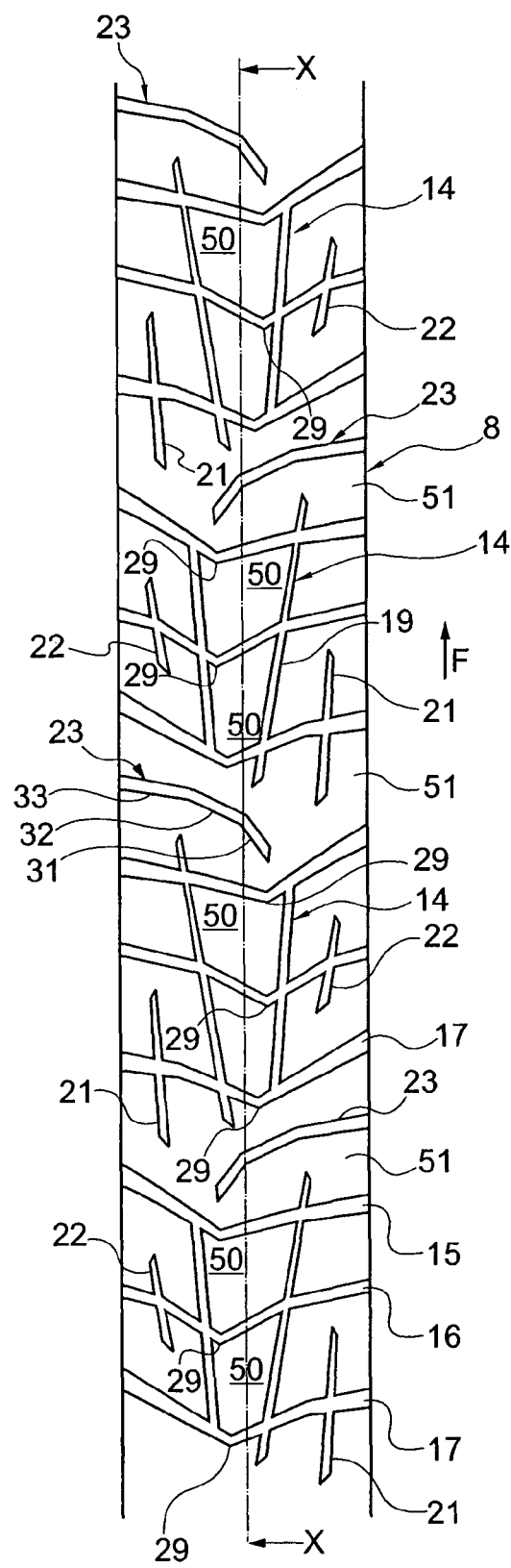
FIG. 2 shows a portion of the circumference of a first example of a tread pattern to be applied to a tyre according to the invention, in particular for a tyre to be mounted on the rear wheel of a motorcycle.
Figure 3:
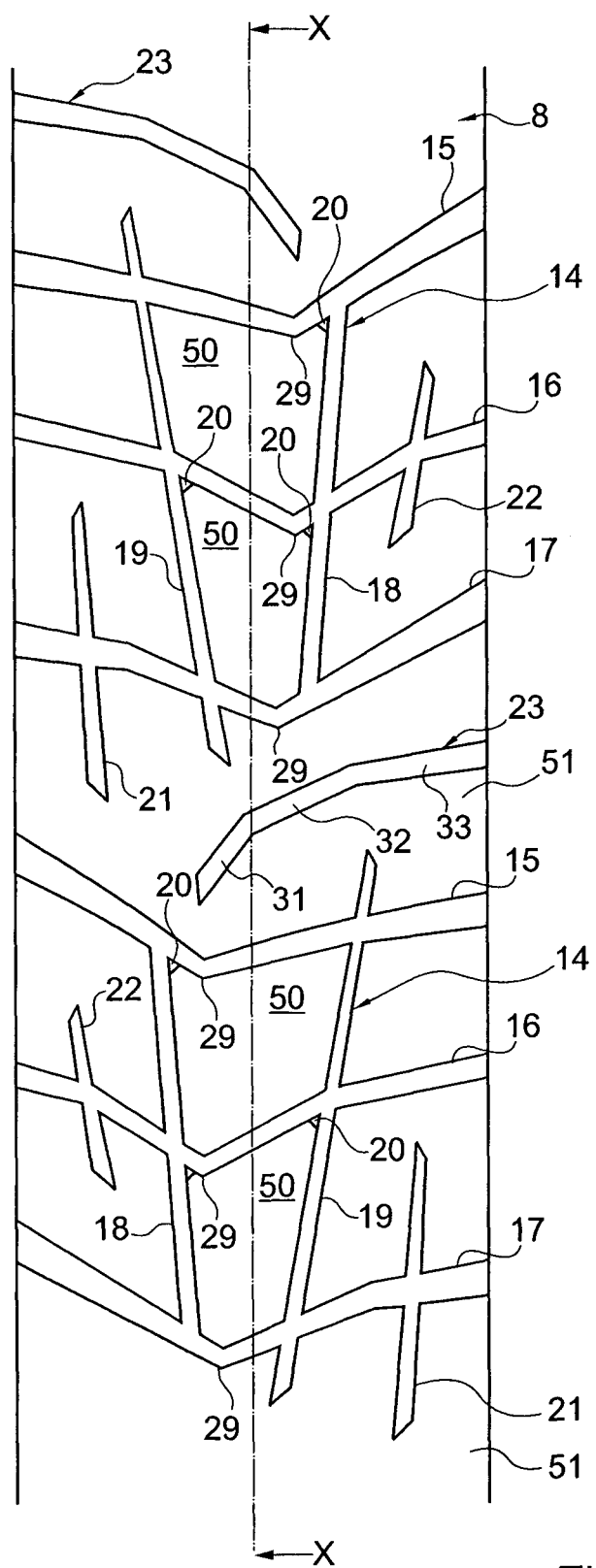
FIG. 3 shows an enlarged section of the portion of the circumference of the tread pattern according to FIG. 2.

In particular, in the embodiment shown in FIGS. 1, 2 and 3 the module 14 is duplicated, on either side of the equatorial plane, in a zone L symmetrically arranged on either side of the equatorial plane X-X.

The zone (L) has a width of between 20% and 65% in the axial direction of the tread band (8), for example equal to 52%.

The module 14 has at least two longitudinal grooves 18, 19 which are situated axially opposite each other relative to the equatorial plane X-X and are inclined relative thereto, and at least two, preferably three, substantially transverse grooves 15, 16, 17 which intersect the said two longitudinal grooves so as to form two blocks 50.

Preferably, each longitudinal groove 18, 19 extends over at least 5% of the circumferential extension of the tyre. The longitudinal grooves 18, 19 define, oppositely arranged, with the equatorial plane X-X each an angle less than or equal to 15°, substantially over its entire length.

In the embodiment shown in FIGS. 1, 2 and 3, the longitudinal grooves 18, 19 do not have the same inclination relative to the equatorial plane X-X.

In particular, the groove 19 has an inclination less than 12°, for example equal to about 10°, with the equatorial plane X-X, while the groove 18 has an inclination less than 6°, for example equal to about 5°, with the equatorial plane X-X.

The groove 19 has a longitudinal extension about 10% greater than the extension of the groove 18.

In the preferred embodiment shown in figures, while the groove 18 extends from the transverse groove 15 as far as the transverse groove 17, the groove 19 extends longitudinally between the transverse groove 15 and the transverse groove 17 continuing beyond both the transverse grooves 15, 17 which delimit the module 14 in the circumferential direction.

The grooves 18, 19 have a depth of between 3 and 10 mm, more preferably between 4 and 9 mm.

The grooves 18, 19 have a width of between 1.5 and 10 mm, preferably between 3 and 8 mm.

Moreover, while the groove 18 has a width which is substantially constant, for example equal to about 7 mm along its entire longitudinal extension, the groove 19 has a width which is variable along its extension, starting, for example, with a width of about 2.2 mm and reaching a width of about 7 mm. Alternatively, the longitudinal grooves could all have the same width and/or depth without departing from the scope of protection of the present invention.

The transverse grooves 15, 16, 17 extend over at least 50% of the width of the tread band from the equatorial plane X-X in both axial directions.

In particular, in the embodiment shown in FIGS. 1, 2 and 3, the transverse grooves 15, 16, 17 extend substantially over the entire width of the tread band.

Preferably the transverse grooves have over their entire extension an inclination of between 45° and 90°, preferably between 55° and 85°, relative to the equatorial plane X-X.

The transverse grooves 15, 16, 17 extend along a broken line so as to form a vertex 29 in the vicinity of the equatorial plane X-X.

The vertices 29 in the vicinity of the equatorial plane of all the circumferential grooves 15, 16, 17 are all directed in the same circumferential direction.

In detail, all the vertices 29 are oriented so that, when the tyre is mounted on the rear wheel of the vehicle, they are directed in the sense of rolling travel of the tyre and, when the tyre is mounted on the front wheel of the vehicle, they are directed in the opposite direction to the previous direction.

In order to limit the wear of the tyre, the vertices 29 of the transverse grooves 15, 16, 17 of the embodiment shown in figures are not situated exactly on the equatorial plane X-X, but at a distance therefrom in the axial direction.

In particular, in each module 14 the vertices 29 are all arranged on the same side in the axial direction relative to the equatorial plane X-X and are spaced by an amount measured along an axial straight line perpendicular to the equatorial plane of between 15 and 30 mm.

Preferably, in each module 14, the vertices 29 of the three grooves 15, 16, 17 do not lie on a straight line parallel to the equatorial plane X-X, but each has its own distance from the equatorial plane X-X.

The transverse grooves 15, 16, 17 have at least one other change in angle along their extension in the direction away from the vertex 29 towards the axially outer edges of the tread band 8.

This further change in angle increases further the inclination of the transverse grooves 15, 16, 17 relative to the equatorial plane X-X so as to increase the traction of the tyre.

The transverse grooves 15, 16, 17 have a depth of between 3 and 10 mm, preferably between 4 and 9 mm, and a width between 4 and 18 mm, preferably between 6 and 15 mm.

The transverse grooves 15, 16, 17 have a width variable along their extension.

In particular, the transverse grooves 15, 16, 17 have a width which increases from the vertex 29 in both the axial directions towards the axially outer edges of the tread band 8.

Alternatively, the transverse grooves 15, 16, 17 could all have the same width and/or depth without departing from the scope of protection of the present invention.

In order to reduce the possibility of initial irregular wear of the tread arising at the intersections between the transverse grooves 15, 16, 17 and the longitudinal grooves 18, 19 and consequently problems of noisiness associated with this type of wear, a rounded-off surface 20 is formed at the sharp corners of the above-mentioned sections.

In order to increase the drainage capacity in particular around bends, the geometric module may have at least two further longitudinal grooves 21, 22 with a limited longitudinal extension, each situated in a middle zone between the equatorial plane X-X and axially outer edge of the tread band 8.

In particular, the further longitudinal grooves 21, 22 have an extension such as to intersect a transverse groove 17 or 18 or 19.

Preferably, the longitudinal grooves 21, 22 extend at the most over 6% of the circumferential extension of the tyre.

The longitudinal grooves 21, 22 have an inclination of less than 11° with the equatorial plane X-X.

The longitudinal grooves 21, 22 have a depth of between 3 and 10 mm, preferably between 4 and 9 mm, and a width of between 3 and 10 mm, preferably between 4 and 8 mm.

The longitudinal grooves 21, 22 have a width variable along their extension. In particular, the longitudinal grooves 21, 22 have a width decreasing in the circumferential direction in the opposite sense to the rolling direction, once the tyre is mounted on the motorcycle, namely in the opposite direction to the arrow F in FIGS. 2 and 3.

The longitudinal grooves 21, 22, in order to balance better the drainage capacity of the tyre around bends, are axially arranged opposite each other relative to the equatorial plane X-X.

Moreover, the longitudinal grooves 21, 22 preferably do not intersect the same transverse groove but two different grooves which are preferably consecutive in the circumferential direction. By way of example, as can be seen in FIG. 2, the longitudinal groove 21 intersects the groove 17 and groove 22 intersects the groove 16.

The tread pattern has, moreover, at least one substantially transverse continuous portion 51 which delimits in the circumferential direction at least one end of the geometric module 14. The portion 51 passes from one side to the other over the whole tread band.

In the embodiment shown in FIGS. 1, 2 and 3 each geometric module 14 is delimited at both ends in the circumferential direction by a substantially transverse continuous portion 51 which extends from one axially outer edge of the tread band 8 to the other edge.

The portion 51 increases the rigidity of the central portion of the tread band so as to increase the riding performance during travel along roads.

The module 14, in the preferred embodiment shown in FIGS. 2, 3, is not repeated identical to itself in the circumferential direction, but each module 14 is symmetrical with the module 14 which is circumferentially consecutive relative to the equatorial plane X-X.

Alternatively, each module 14 may be repeated identical to itself in the circumferential direction without departing from the scope of protection of the present invention.

A further substantially transverse groove 23 situated in the portion 51 is also provided between two circumferentially consecutive modules 14.

The transverse groove 23 extends in the portion 51 from an axial end edge of the tread band to a point beyond the equatorial plane X-X.

The transverse groove 23 is arranged along a broken line so as to form a plurality of sections, for example three sections 31, 32, 33, with an inclination increasing relative to the equatorial plane X-X in the direction away from the equatorial plane X-X towards the axially outer edge of the tread band.

In particular, the section 31 situated in the vicinity of the equatorial plane X-X forms with the latter an inclination greater than 30° and preferably less than 40°, for example equal to about 37.5°.

The second section 32, which is arranged after the section 31, has an inclination with the equatorial plane X-X greater than 40° and preferably less than 70°, for example equal to about 65°.

Finally the third section 23, arranged after the section 22 and in the vicinity of the outer axial edge of the tread band has an inclination relative to the equatorial plane X-X greater than 70°, preferably less than 100°, for example equal to about 81°.

The grooves 23 situated at opposite circumferential ends of the modules 14 are arranged symmetrically relative to the equatorial plane X-X.

Tables 1 and 2 below show the riding results obtained from a comparison between two sets of tyres mounted on the wheels of a motorcycle (Yamaha XT 660) loaded with the weight of a passenger together with a side pannier weighing 7 kg on either side.

In particular, the second set comprises a pair of tyres according to the invention, front size 110/80 R19, rear size 150/70 R17, while the first set comprises a pair of Pirelli MT 90 tyres with the same size in each case.

The tyres of the two pairs differ only in terms of the tread band pattern, but have the same carcass and belt structure.

Table 1 shows the results obtained with the tyre according to the invention, in dry conditions, compared to the comparison tyre, relating to four parameters: stability when exiting from a bend, stability after manoeuvring, vibrations, "flip flop" manoeuvre.

TABLE 1

|  | 1st set (comparison) | 2nd set (invention) |
| --- | --- | --- |
| Stability induced when exiting from bend | 3.50 | 4.50 |
|  | 3.0 | 3.90 |
| Stability after manoeuvring | 3.00 | 3.30 |
| Vibrations | 3.00 | 4.50 |
| Flip flop manoeuvre | 3.50 | 4.00 |

The tyre according to the invention has an overall behaviour better than that of the comparison tyre with regard to all the characteristics assessed during roadway travel in dry conditions.

The stability around bends and the stability after manoeuvring are characteristics which are very important for the behaviour of the tyre around bends, both when accelerating out of the bend and travelling with full lean, and along a straight section when exiting from a bend or after a manoeuvre which required a change in direction thereof.

In particular, owing to the quantity of rubber in contact with the ground in this zone, it is possible to avoid a reduction in stability when accelerating out of a bend.

On the other hand, the vibrations perceived by the rider are an excellent indication of the comfort provided by this tyre when travelling long distances along roads.

In other words, the set comprising the tyre according to the invention ensures a better behaviour in terms of stability in dry conditions with a load compared to the reference set.

In particular, the tyre according to the present invention ensures adequate compactness of both the vertical and lateral structure, without adversely affecting the capacity to absorb vibrations or the roughness of the road surface and hence without negative steering sensitivity in terms of damping or reduction of the vibrations.

Table 2 instead shows the results obtained with the tyre according to the invention in wet conditions compared to the comparison tyre, with regard to four parameters: traction along straight sections, grip (front wheel/rear wheel), braking action (front wheel/rear wheel), drainage.

As regards drainage it is pointed out that the test was performed along a straight (0°), with half lean (1st stage) and full lean (2nd stage).

TABLE 2

|  |  |  | 1st set (comparison) | 2nd set (invention) |
| --- | --- | --- | --- | --- |
| Traction along a straight |  |  | 4.00 | 4.00 |
| Grip |  | front wheel | 3.3 | 3.8 |
|  |  | rear wheel | 3.0 | 3.7 |
| Braking |  | front wheel | 3.50 | 4.00 |
|  |  | rear wheel | 3.30 | 4.00 |
| Drainage | front wheel | 0° | 4.00 | 4.00 |
|  |  | 1st stage | 3.80 | 4.00 |
|  |  | 2nd stage | 3.30 | 3.70 |

TABLE 2-continued

|  |  | 1st set (comparison) | 2nd set (invention) |
|---|---|---|---|
| rear wheel | 0° | 4.00 | 4.00 |
|  | 1st stage | 3.50 | 4.00 |
|  | 2nd stage | 3.00 | 3.50 |

The tyre according to the invention has an overall behaviour better than that of the comparison tyre as regards all the characteristics assessed, except for the traction along straight sections, where it is in any case equivalent, during wet road travel.

The data shown above are self-explanatory; in particular the tyre according to the present invention has excellent traction properties along straight road sections, excellent grip both on the front wheel and on the rear wheel, and good water drainage properties for both wheel tyres.

The present invention has been described with reference to certain embodiments. Various modifications may be made to the embodiments described in detail while remaining within the scope of protection of the invention defined by the following claims.

The invention claimed is:

1. A motorcycle tyre, comprising:
a tread band with a tread pattern comprising, in a zone symmetrically arranged on either side of an equatorial plane, a first module repeatedly duplicated in a direction of circumferential extension of the tyre, the first module comprising:
at least two first longitudinal grooves inclined in an oppositely arranged manner relative to the equatorial plane;
at least two substantially transverse grooves designed to intersect said two first longitudinal grooves so as to define at least one block; and
a further transverse groove defining a further block with said two first longitudinal grooves,
said zone having a width in an axial direction of between 20% and 65% of the width of the tread band and a solids/voids ratio equal to at least 0.20; and
said tread pattern also having at least one substantially transverse continuous tread band portion which extends over the entire width of the tread band delimiting at least one end of said module in the circumferential direction.

2. The tyre according to claim 1, wherein said at least two substantially transverse grooves and said further transverse groove are arranged along broken lines.

3. The tyre according to claim 1, wherein said at least two substantially transverse grooves and said further transverse groove extend axially over at least 50% of the width of the tread band.

4. The tyre according to claim 1, wherein at least one of said at least two substantially transverse grooves and said further transverse groove is arranged along a broken line so as to form a vertex between said two first longitudinal grooves.

5. The tyre according to claim 1, wherein said at least two substantially transverse grooves and said further transverse groove are arranged along broken lines so as to form vertices between said two first longitudinal grooves.

6. The tyre according to claim 5, wherein said vertices are all spaced, in the same direction axially, relative to the equatorial plane.

7. The tyre according to claim 5, wherein said vertices are all directed in the same direction circumferentially.

8. The tyre according to claim 5, wherein said vertices of a same module are situated axially opposite, relative to the equatorial plane, to vertices of a circumferentially consecutive geometric module.

9. The tyre according to claim 1, wherein said at least two substantially transverse grooves and said further transverse groove have a depth greater than or equal to 3 mm.

10. The tyre according to claim 1, wherein said at least two substantially transverse grooves and said further transverse groove have a depth less than or equal to 10 mm.

11. The tyre according to claim 1, wherein said at least two substantially transverse grooves and said further transverse groove have a width greater than or equal to 4 mm.

12. The tyre according to claim 1, wherein said at least two substantially transverse grooves and said further transverse groove have a width less than or equal to 18 mm.

13. The tyre according to claim 1, wherein the said at least two substantially transverse grooves and said further transverse groove have a width variable along an extension thereof so as to increase toward axially outer edges of the tread band.

14. The tyre according to claim 1, wherein each of said two first longitudinal grooves has a longitudinal extension equal to at least 5% of the circumferential extension of the tyre.

15. The tyre according to claim 1, wherein said two first longitudinal grooves have an inclination less than or equal to 15° relative to the equatorial plane.

16. The tyre according to claim 15, wherein said two first longitudinal grooves have a different inclination relative to the equatorial plane.

17. The tyre according to claim 1, wherein one of the said two first longitudinal grooves has a longitudinal extension greater than a remaining longitudinal groove.

18. The tyre according to claim 1, wherein said two first longitudinal grooves have a depth greater than or equal to 3 mm.

19. The tyre according to claim 1, wherein said two first longitudinal grooves have a depth less than or equal to 10 mm.

20. The tyre according to claim 1, wherein said two first longitudinal grooves have a width greater than or equal to 1.5 mm.

21. The tyre according to claim 1, wherein said two first longitudinal grooves have a width less than or equal to 10 mm.

22. The tyre according to claim 1, wherein at least one of said two first longitudinal grooves has a width variable along its extension.

23. The tyre according to claim 1, wherein said first module comprises at least one second substantially longitudinal groove axially on an outside with respect to the longitudinal grooves and situated in a middle zone between the equatorial plane and an axially outer edge of the tread band.

24. The tyre according to claim 23, wherein said second substantially longitudinal groove has an inclination of less than 11° with the equatorial plane.

25. The tyre according to claim 1, wherein each module is symmetrical with a module which is circumferentially consecutive relative to the equatorial plane.

26. The tyre according to claim 1, wherein a further substantially transverse groove is provided in a portion between two circumferentially consecutive modules.

27. The tyre according to claim 26, wherein said substantially transverse groove is arranged along a broken line so as to form three sections with an inclination increasing relative to the equatorial plane from the equatorial plane to an axially outer edge of the tread band.

28. A motorcycle tyre, comprising:
a tread band with a tread pattern comprising, in a zone symmetrically arranged on either side of an equatorial plane, a first module repeatedly duplicated in a direction of circumferential extension of the tyre, the first module comprising:
- at least two first longitudinal grooves inclined in an oppositely arranged manner relative to the equatorial plane, one of the said two first longitudinal grooves having a longitudinal extension greater than a remaining longitudinal groove; and
- at least two substantially transverse grooves designed to intersect said two first longitudinal grooves so as to define at least one block, said zone having a width in an axial direction of between 20% and 65% of the width of the tread band and a solids/voids ratio equal to at least 0.20; and
said tread pattern also having at least one substantially transverse continuous tread band portion which extends over the entire width of the tread band delimiting at least one end of said module in the circumferential direction.

29. A motorcycle tyre, comprising:
a tread band with a tread pattern comprising, in a zone symmetrically arranged on either side of an equatorial plane, a first module repeatedly duplicated in a direction of circumferential extension of the tyre, the first module comprising:
- at least two first longitudinal grooves inclined in an oppositely arranged manner relative to the equatorial plane;
- at least two substantially transverse grooves designed to intersect said two first longitudinal grooves as to device at least one block; and
- at least one second substantially longitudinal groove axially on an outside with respect to the first longitudinal grooves and situated in a middle zone between the equatorial plane and an axially outer edge of the tread band, said zone having a width in an axial direction of between 20% and 65% of the width of the tread band and a solids/voids ratio equal to at least 0.20; and
said tread pattern also having at least one substantially transverse continuous tread band portion which extends over the entire width of the tread band delimiting at least one end of said module in the circumferential direction.

30. A motorcycle tyre, comprising:
a tread band with a tread pattern comprising, in a zone symmetrically arranged on either side of an equatorial plane, a first module repeatedly duplicated in a direction of circumferential extension of the tyre, the first module comprising:
- at least two first longitudinal grooves inclined in an oppositely arranges manner relative to the equatorial plane; and
- at least two substantially transverse grooves designed to intersect said two first longitudinal grooves so as to define at least one block, said zone having a width in an axial direction of between 20% and 65% of the width of the tread band and a solids/voids ratio equal to at least 0.20;
said tread pattern also having at least one substantially transverse continuous tread band portion which extends over the entire width of the tread bank delimiting at least one end of said module in the circumferential direction; and
a further substantially transverse groove provided in a portion between two circumferentially consecutive modules.

* * * * *